(12) United States Patent
Rabhi

(10) Patent No.: US 10,632,829 B2
(45) Date of Patent: Apr. 28, 2020

(54) DISTRIBUTER PHASE SHIFTER FOR A HYDRAULIC PUMP MOTOR

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 671 days.

(21) Appl. No.: 15/048,424

(22) Filed: Feb. 19, 2016

(65) Prior Publication Data
US 2016/0245084 A1 Aug. 25, 2016

Related U.S. Application Data

(60) Provisional application No. 62/118,654, filed on Feb. 20, 2015.

(51) Int. Cl.

| | |
|---|---|
| *F01C 20/10* | (2006.01) |
| *F01C 1/38* | (2006.01) |
| *F01C 1/344* | (2006.01) |
| *F01C 21/08* | (2006.01) |
| *F01C 21/10* | (2006.01) |
| *F04C 14/10* | (2006.01) |
| *F04C 2/344* | (2006.01) |
| *B60K 6/12* | (2006.01) |
| *F04B 9/10* | (2006.01) |
| *F03C 1/40* | (2006.01) |
| *F03C 1/30* | (2006.01) |

(52) U.S. Cl.
CPC ............ B60K 6/12 (2013.01); F03C 1/045 (2013.01); F03C 1/0409 (2013.01); F03C 1/0466 (2013.01); F04B 9/10 (2013.01)

(58) Field of Classification Search
CPC ...... F03C 1/0409; F03C 1/0466; F03C 1/045; B60K 6/12; F04C 2/04; F04B 9/10; F04B 1/047; F04B 1/063; F02M 39/02

USPC .............. 91/490–492, 482; 60/493; 384/550; 417/462, 206, 273

See application file for complete search history.

(56) References Cited

U.S. PATENT DOCUMENTS

| | | | | |
|---|---|---|---|---|
| 456,315 A | * | 7/1891 | Ruths .................... | F04B 1/2042 91/6.5 |
| 727,772 A | * | 5/1903 | Fenton .................. | F04B 1/2042 91/6.5 |
| 729,313 A | * | 5/1903 | Fenton .................. | F04B 1/2042 91/6.5 |

(Continued)

OTHER PUBLICATIONS

Holroyd (Holroyd, "Worm Gears—Applications & Uses", Precision Technologies Group, Sep. 4, 2014, Blog posted at http://www.holroyd.com/blog/worm-gear-applications-uses/, retrieved Mar. 19, 2018).*

*Primary Examiner* — Nathaniel E Wiehe
*Assistant Examiner* — Richard C Drake
(74) *Attorney, Agent, or Firm* — Young & Thompson

(57) ABSTRACT

The distributor phase shifter for a hydraulic pump motor (300) is provided for a hydraulic pump motor (1) which includes a pump motor housing (2) and a pump motor central rotor (3) to which an input-output distributor (43) presents an input-output angular collector of an internal conduit (44) and an input-output angular collector of an external conduit (89), which phase shifter includes a phase shift acting element (301) which is supported on the housing of the pump motor (2) in order to make the input-output distributor (43) rotate around its longitudinal axis and over a determined angular range.

10 Claims, 6 Drawing Sheets

(56) References Cited

U.S. PATENT DOCUMENTS

| | | | | |
|---|---|---|---|---|
| 1,506,893 | A * | 9/1924 | Egersdorfer | F04B 1/0443 91/485 |
| 2,018,516 | A * | 10/1935 | Edwards | F02D 35/00 123/495 |
| 2,248,529 | A * | 7/1941 | Attwood | F02M 41/04 123/364 |
| 3,485,139 | A * | 12/1969 | Sheesley | F03C 1/0406 91/391 R |
| 3,598,507 | A * | 8/1971 | Voit | F02M 41/1405 123/450 |
| 3,621,760 | A * | 11/1971 | Goode | F03C 1/02 91/188 |
| 3,661,057 | A * | 5/1972 | Rogov | F03C 1/0409 91/482 |
| 4,038,948 | A * | 8/1977 | Blackwood | F01B 1/0668 123/43 C |
| 4,157,056 | A * | 6/1979 | Allart | F04B 1/063 91/491 |
| 4,351,283 | A * | 9/1982 | Ament | F02M 41/1411 123/458 |
| 4,356,761 | A * | 11/1982 | Cameron-Johnson | F04B 1/0408 91/488 |
| 4,404,896 | A * | 9/1983 | Allart | F03C 1/045 91/491 |
| 4,532,854 | A * | 8/1985 | Foster | F03C 1/045 91/491 |
| 4,730,585 | A * | 3/1988 | Abe | F02D 41/2096 123/300 |
| 4,923,027 | A * | 5/1990 | Hayashi | B60T 11/20 180/219 |
| 5,261,318 | A * | 11/1993 | Allart | F04B 1/0465 91/491 |
| 6,481,388 | B1 * | 11/2002 | Yamamoto | F01P 7/044 123/41.1 |
| 6,619,184 | B1 * | 9/2003 | Legner | F03C 1/045 60/436 |
| 6,637,383 | B2 * | 10/2003 | Al-Hawaj | F01B 13/04 123/43 C |
| 7,350,593 | B1 * | 4/2008 | Brookover | E21B 7/022 173/11 |
| 9,038,378 | B2 * | 5/2015 | Heren | F16H 61/4052 60/483 |
| 9,546,654 | B2 * | 1/2017 | Rabhi | F16C 33/306 |
| 9,566,385 | B2 * | 2/2017 | Franks | A61M 5/14216 |
| 2014/0219600 | A1 * | 8/2014 | Rabhi | F16C 33/306 384/550 |
| 2016/0265518 | A1 * | 9/2016 | Vianney | F04B 1/005 |

\* cited by examiner

DISTRIBUTER PHASE SHIFTER FOR A HYDRAULIC PUMP MOTOR

FIELD OF THE INVENTION

The present invention relates to a distributor phase shifter for a hydraulic pump motor that constitutes an improvement of the hydraulic pump motor constituting the subject of the French patent application No. 3 001775 dated May 22, 2013 belonging to the applicant.

BACKGROUND OF THE INVENTION

The hydraulic pump motor forming the subject of this application comprises a central rotor of the pump motor inside of which hydraulic cylinders are arranged. Hydraulic pistons can move inside these cylinders. When the central rotor rotates relative to the housing of the pump motor, these cylinders are alternately put in a relationship with an internal input-output conduit, then with an external input-output conduit by an input-output distributor constituted either by a cylindrical stator or by an axial stator. To this end this distributor has an internal input-output conduit angular collector central to this rotor which is connected to the internal input-output conduit, and has an external input-output conduit angular collector which is connected to the external input-output conduit.

Oil from the pump motor can therefore pass alternatively from this distributor to this cylinders, then from this cylinders to this distributor via this collectors in particular due to an internal input-output canal of the central rotor which connects each hydraulic cylinder to an input-output orifice of the central rotor which can be placed either facing the input-output angular collector of the internal conduit or facing the input-output angular one of the external conduit.

It is noted that in the U.S. Pat. No. 3,001,775 belonging to the applicant the angular phasing of the input-output distributor relative to the housing of the pump motor is fixed. Now, the conditions of operation of this pump motor can vary in particular in pressure and in the piston swept volume and whether this pump motor is operated in in "pump" mode or in "motor" mode. Each condition of the operation corresponds—for a criterion of the best output of the hydraulic pump motor—to an optimum angular phasing of the input-output distributor relative to the housing of the pump motor.

Consequently, it would be desirable that the phasing of the input-output distributor is variable in particular as a function of the pressure, of the piston swept volume and of the "pump" or "motor" mode under which this pump motor is operating with the objective of optimizing the output of the latter.

The significance of this variable phasing stems in particular from the non-null compressibility of the pump motor oil implemented in this pump motor. In fact, this compressibility brings about non-recoverable work losses when there is a significant separation of pressure between on the one hand an internal canal of input-output of the central rotor connected to a hydraulic cylinder and on the other hand the input-output angular collector of the internal or external conduit at the moment at which this internal canal is placed in rotation via its input-output orifice of the central rotor with this collector.

In fact, when this canal is related to this angular collector, if the pressure prevailing in this canal is greater than the one prevailing in this collector, the pump motor oil contained in this canal is relaxed in this collector without producing work in such a manner that the compression energy of the pump motor oil is dissipated in the form of heat without being able to be converted into useful work by the central rotor of the pump motor.

It is the same if the pressure prevailing in the input-output angular collector of the internal or external conduit is greater than the one prevailing in the internal input-output canal of the central rotor at the moment at which the latter is placed in a relationship with this connector.

For a given pressure and a piston swept volume of the hydraulic pump motor according to the application of the U.S. Pat. No. 3,001,775, a single phasing of this angular collectors relative to the housing of the pump motor permits this pump motor to deliver its best delivery when this pump motor is operating in the "pump" mode while a single other phasing of this connectors gives this pump motor the best possible delivery when the latter is operating in the "motor" mode.

In order to obtain a maximum delivery from the pump motor according to the application of U.S. Pat. No. 3,001,775, it would be required that the angular sector occupied by the input-output angular collectors of the internal and external conduits are variable and it would also be required that the angular position of these connectors relative to the pump motor housing would be variable.

Unfortunately, it is difficult or even impossible in practice to vary the angular sector occupied by the input-output angular collectors of the external conduit just as it is difficult or even impossible to vary the angular position of each of these collectors relative to the pump motor housing independently of each other. This is due to the fact that this angular sectors are arranged in the input-output distributor that is constituted by one and the same piece.

On the other hand, subject to the necessary means being provided, it would be a priori possible to vary the angular position of the input-output distributor relative to the pump motor housing. This additional function, which is not provided in the U.S. Pat. No. 3,001,775 would permit in particular providing for the input-output distributor an angular position when the hydraulic pump motor is operating in "pump" mode different from the one retained when this pump motor is operating in the "motor" mode. This angular position could also be determined by the pressure and/or the piston swept volume under which the hydraulic pump motor is operating or by any other parameter, whatever its nature. This would result in a substantial gain of delivery and of efficiency for the pump motor according to the U.S. Pat. No. 3,001,775.

SUMMARY OF THE INVENTION

Therefore, in order to significantly improve the delivery of the pump motor according to U.S. Pat. No. 3,001,775 in particular when this pump motor passes from the "pump" mode to the "motor" mode and inversely, the distributor phase shifter for the hydraulic pump motor according to the invention permits, as a function of the embodiment concerned:

varying in a discrete manner the angular position of the input-output distributor relative to the pump motor housing, which position can have at least two values; and/or varying the angular position of the input-output distributor relative to the pump motor housing in a continuous manner, which position can assume a great number, even an infinity of values between two extreme values.

Moreover, the distributor phase shifter for a hydraulic pump motor according to the invention is provided to be integrated in the pump motor according to the U.S. Pat. No.

3,001,775 without jeopardizing the feasibility of this pump motor at a moderate manufacturing cost price and without having to use any realization process that is complex or uses expensive material.

It is understood that aside from its application in the pump motor according to the U.S. Pat. No. 3,001,775 the distributor phase shifter for a hydraulic pump motor according to the invention can be applied to any other hydraulic or pneumatic pump motor whose configuration advantageously permits this phase shifter to be exploited.

The other characteristics of the present invention have been described in the description and in the secondary claims directly or indirectly dependent on the main claim.

The distributor phase shifter for a hydraulic pump motor in accordance with the present invention is provided for a hydraulic pump motor that comprises a pump motor housing on the one hand and a pump motor central rotor on the other hand, which latter houses at least one hydraulic cylinder in which a hydraulic piston can move in translation, which central rotor cooperates with an input-output distributor which presents it with an input-output angular collector of an internal conduit and an input-output annular collector of an external conduit in such a manner that when this rotor rotates relative to the pump motor housing, the hydraulic cylinder is alternately placed in relation—via an input-output internal canal of the central rotor and then an input-output orifice of the central rotor—with an input-output internal conduit by the input-output annular collector of the internal conduit, then with an input-output external conduit by the input-output annular collector of the external conduit, which phase shifter comprises:

At least one phase shift acting element which is directly or indirectly supported on the pump motor housing in order to be able to rotate the input-output distributor around its longitudinal axis and over a determined angular range while acting directly or indirectly on means for entrainment in rotation of which at least one part is integral with this distributor.

The distributor phase shifter for a hydraulic pump motor in accordance with the present invention comprises a phase shift acting element which is a double-acting hydraulic jack whose double-acting piston defines, with a jack cylinder and two jack ends, two jack chambers, the first chamber of which communicates with the input-output internal conduit whereas the second jack chamber communicates with the input-output external conduit.

The distributor phase shifter for a hydraulic pump motor according to the present invention comprises a phase shift acting element which is constituted by two single-acting hydraulic jacks whose single-acting piston defines, with a jack cylinder and a jack end, a jack chamber, which jack chamber of this first hydraulic jack communicates with the input-output internal conduit while the jack chamber of this second hydraulic jack communicates with the input-output external conduit while the single-acting piston of this first hydraulic jack can—via the means for entraining in rotation—entrain the input-output distributer in a first direction while the single-acting piston of this second hydraulic jack can—via the means for entraining in rotation—entrain the input-output distributor in a second direction.

The distributor phase shifter for a hydraulic pump motor in accordance with the present invention comprises a phase shift acting element and/or means for entraining in rotation which cooperate with at least one return spring of the acting element.

The distributor phase shifter for a hydraulic pump motor in accordance with the present invention comprises a jack chamber which houses at least one return spring of the acting element which is directly or indirectly supported on the jack end on the one hand and on the double-acting piston or on the single-acting piston on the other hand.

The distributor phase shifter for a hydraulic pump motor in accordance with the present invention comprises a phase shift acting element which is an electrical motor that can entrain in rotation an endless screw while the means for entrainment in rotation is constituted by a worm crown wheel integral with the input-output distributor and on which the endless worm meshes.

The distributor phase shifter for a hydraulic pump motor in accordance with the present invention comprises means for entrainment in rotation which comprises a phase shift lever integral with the input-output distributor, which lever is linked to the phase shift acting element directly or by the intermediation of a phase shift rocker bar.

The distributor phase shifter for a hydraulic pump motor in accordance with the present invention comprises means for entrainment in rotation which is constituted by a phase shift rack that can be moved in translation by the phase shift acting element, which rack cooperates with a toothed phase shift wheel integral with the input-output distributor.

The distributor phase shifter for a hydraulic pump motor in accordance with the present invention comprises a phase shift acting element which is a hydraulic jack driven with single action or double action whose at least one jack chamber can be put in relation either with a high-pressure hydraulic source or with a low-pressure hydraulic source by at least one phase shift electrical valve.

BRIEF DESCRIPTION OF THE DRAWINGS

The following specification allows the invention to be better understood with reference made to the attached drawings given by way of non-limiting examples and the characteristics which it presents and the advantages which it can bring about.

DETAILED DESCRIPTION OF THE INVENTION

FIGS. 1 to 6 showed the distributor phase shifter for a hydraulic pump motor 300, various details of its components, its variants and its accessories.

Figure 1:
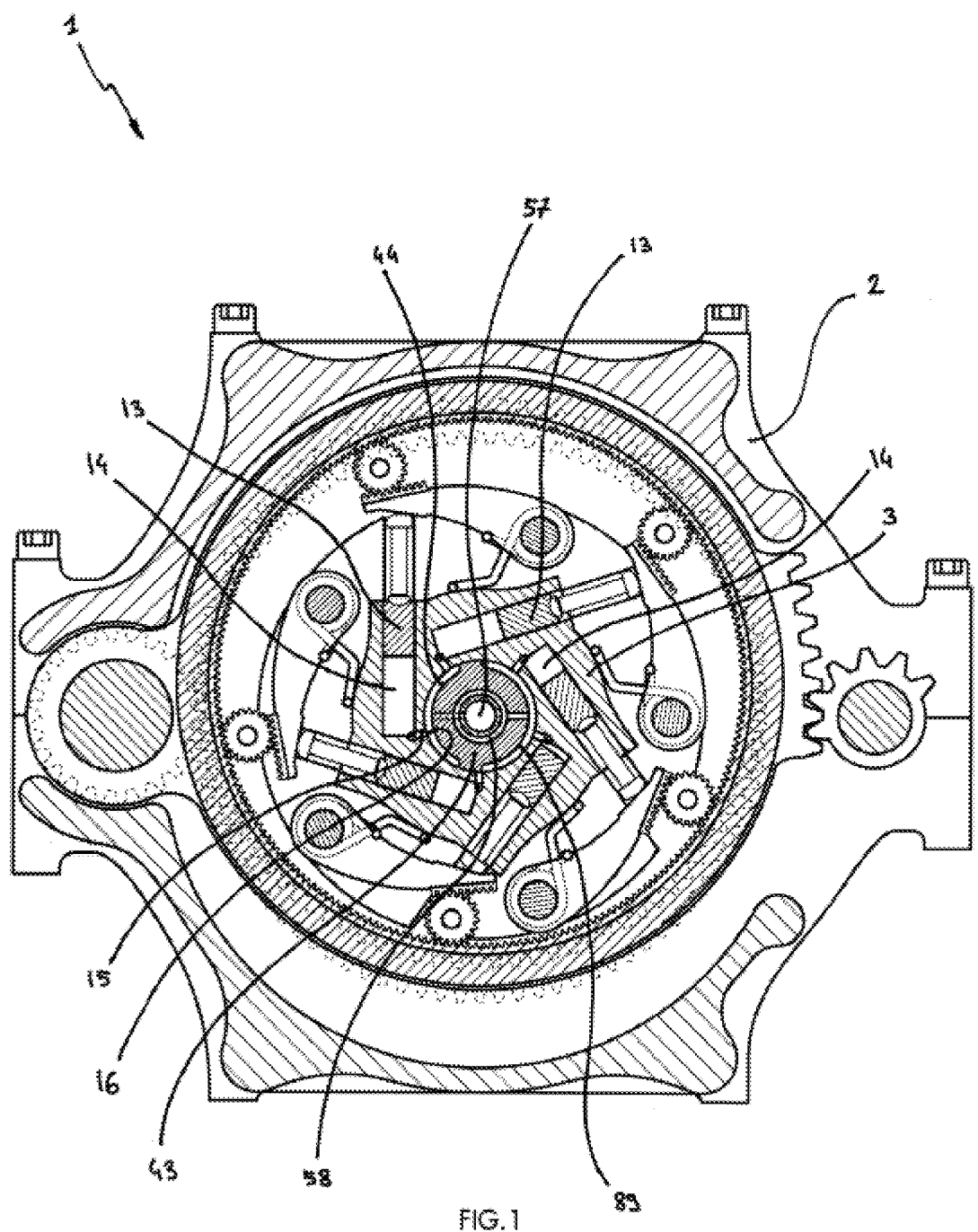
FIG. 1 shows a schematic section of the hydraulic pump motor to which the distributor phase shifter for a hydraulic pump motor is applied.

The distributor phase shifter for a hydraulic pump motor 300 is provided for a hydraulic pump motor 1 such as is shown in FIG. 1 and which comprises a motor pump housing 2 on the one hand and a motor pump central rotor 3 on the other hand, which latter houses at least one hydraulic cylinder 14 in which a hydraulic piston 13 can move in translation, which central rotor 3 cooperates with an input-output distributor 43 which presents it with an input-output angular collector of internal conduit 44 and with an input-output angular collector of external conduit 89 in such a manner that when this rotor 3 rotates relative to the housing of pump motor 2, the hydraulic cylinder 14 is alternately put in relationship—via an input-output internal canal of central rotor 15, then by an input-output orifice of central rotor 16—with an input-output internal conduit 57 by the input-output angular collector of internal conduit 44, then with an input-output external conduit 58 by the input-output angular collector of external conduit 89.

As FIGS. 2 to 6 show, the distributor phase shifter for hydraulic pump motor 300 according to the invention comprises at least one phase shift acting element 301 which is directly or indirectly supported on the housing of pump motor 2 in order to be able to rotate the input-output distributor 43 around its longitudinal axis and over a determined angular range by acting directly or indirectly on means for entrainment in rotation 302 of which at least one part is integral with this distributor 43.

Note that this configuration is applied so that the input-output distributor 43 is a cylindrical stator housed with slight play in a stator cylinder arranged in the center of the central rotor of pump motor 3 and coaxially to the latter, or that the input-output distributor 43 is an axial stator constituted by a distribution end shield and a balancing end shield placed axially on both sides of the central rotor of the pump motor 3 respectively facing a distribution face and a balancing face arranged on this rotor 3, which end shields are mechanically connected to one another by a central axial stator hub which axially traverses this central rotor 3 via a stator cylinder arranged at the center of this central rotor 3 and coaxially to the latter.

Note that in order to facilitate the rotation, the input-output distributor 43 can be mounted entirely or in part on at least one ball bearing or on rollers.

Figure 2:
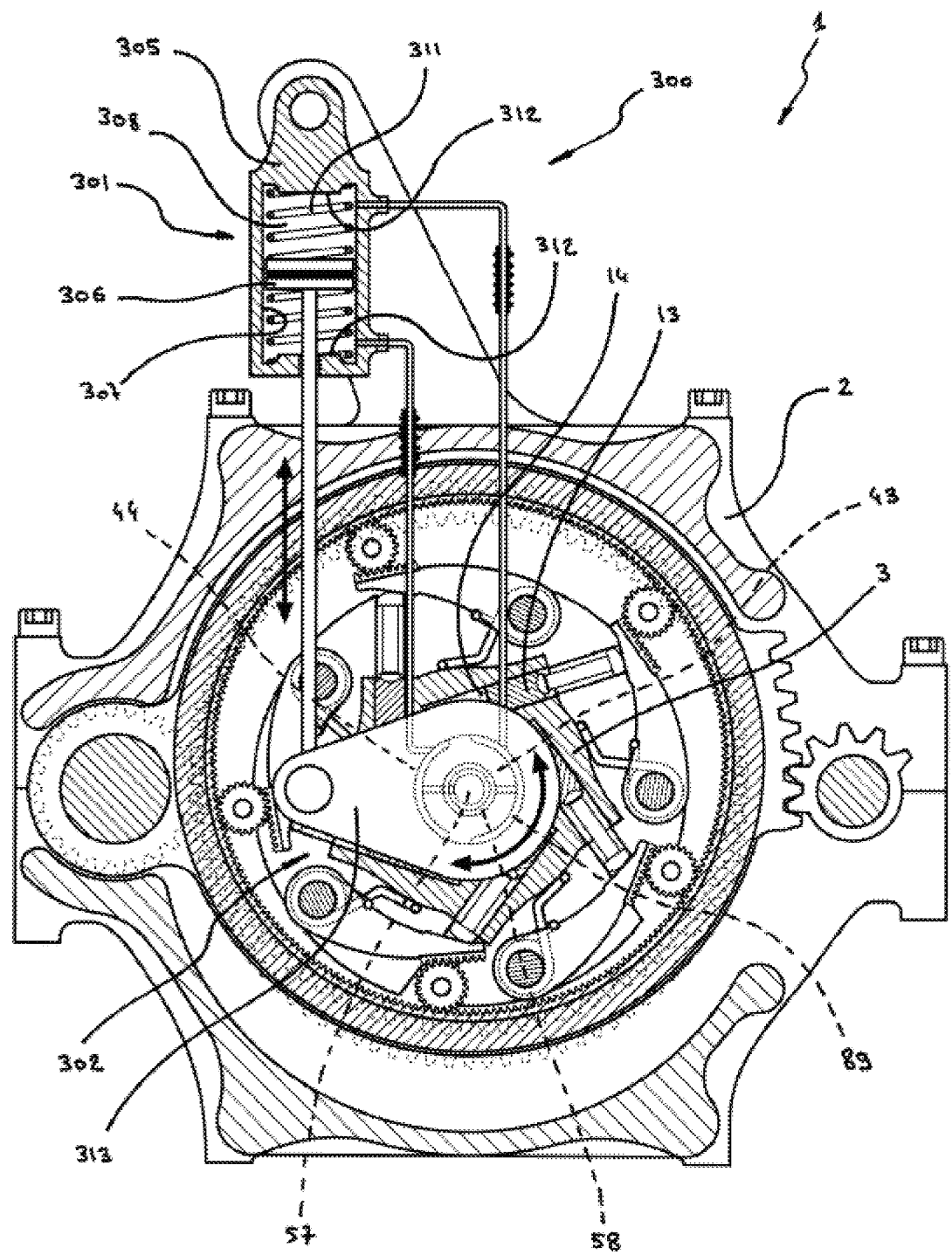
FIG. 2 shows a schematic section of the distributor phase shifter for a hydraulic pump motor according to the invention equipping the hydraulic pump motor, which phase shifter is constituted in particular by a double-acting hydraulic jack whose first jack chamber communicates with the input-output internal conduit of this pump motor and whose second jack chamber communicates with the input-output external conduit of this pump motor.

According to a variant shown in FIG. 2 of the distributor phase shifter for hydraulic pump motor 300 according to the invention it is provided that the phase shift acting element 301 can be a double-acting hydraulic jack 305 whose double-acting piston 306 defines, with a jack cylinder 307 and two jack ends 312, two jack chambers 308, wherein the first chamber 308 communicates with the input-output internal conduit 57 whereas the second jack chamber 308 communicates with the input-output external conduit 58 in such a manner that as soon as the hydraulic pump motor 1 begins to operate in "pump" mode, the double-acting piston 306 acts naturally on the means for entrainment in rotation 302 in order that the input-output distributor 43 rotates in a first direction, whereas when this hydraulic pump motor 1 begins to operate in the "motor" mode, this piston 306 acts automatically on this means 302 in such a manner that this distributor 43 rotates in a second direction.

Figure 3:
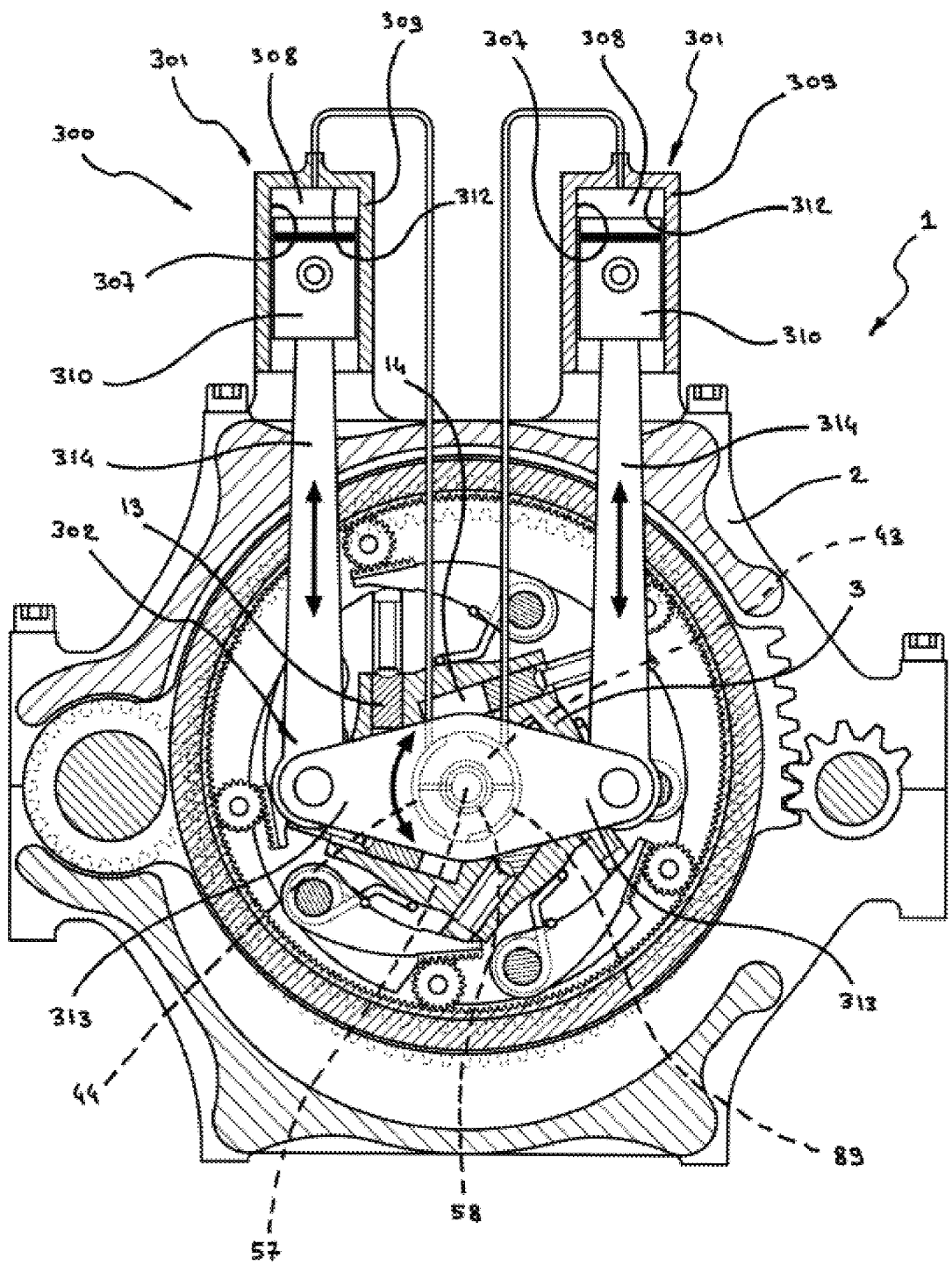
FIG. 3 shows a schematic section of the distributor phase shifter for a hydraulic pump motor according to the invention equipping the hydraulic pump motor, which phase shifter is constituted in particular by two single-acting hydraulic jacks, of which the first jack is connected to the input-output internal conduit of this pump motor while the second jack is connected to the input-output external conduit of this pump motor.

Another variant shown in FIG. 3 of the distributor phase shifter for hydraulic pump motor 300 according to the invention provides that the phase shift acting element 301 can be constituted by two single-acting hydraulic jacks 309 of which the single-acting piston 310 defines with a jack cylinder 307 and a jack end 312 a jack chamber 308, wherein the jack chamber 308 of this first hydraulic jack 309 communicates with the input-output internal conduit 57 whereas the jack chamber 308 of this second hydraulic jack 309 communicates with the input-output external conduit 58 whereas the single-acting piston 310 of this first hydraulic jack 309 can entrain—via the means for entrainment in rotation 302—the input-output distributor 43 in a first direction whereas the single-acting piston 310 of this second hydraulic jack 309 can entrain the input-output distributor 43 in a second direction via the means for entrainment in rotation 302.

Therefore, when the hydraulic pump motor 1 begins to operate in the "pump" mode the single-acting piston 310 of the first single-acting hydraulic jack 309 naturally acts on the means for entrainment in rotation 302 in such a manner that the input-output distributor 43 rotates in a first direction whereas when this hydraulic pump motor 1 begins to operate in the "motor" mode the single-acting piston 310 of the single-acting second hydraulic jack 309 automatically acts on this means 302 in such a manner that this distributor 43 rotates in a second direction.

Note that the phase shift acting element 301 and/or the means for entrainment in rotation 302 can cooperate with at least one return spring of acting element 311, which exerts an antagonistic force to the one that the phase shift acting element 301 can exert.

As FIG. 2 shows, the jack chamber 308 can house at least one return spring of acting element 311 which is directly or indirectly supported on the end of jack 312 on the one hand and on the other hand on the double-acting piston 306 or on the single-acting piston 310 in such a manner that, for example, when the pressure prevailing in the input-output internal conduit 57 is identical to or comparable to that prevailing in the input-output external conduit 58, the angular position of the input-output distributor 43 is approximately centered relative to the extreme angular positions of this distributor 43.

Figure 4:
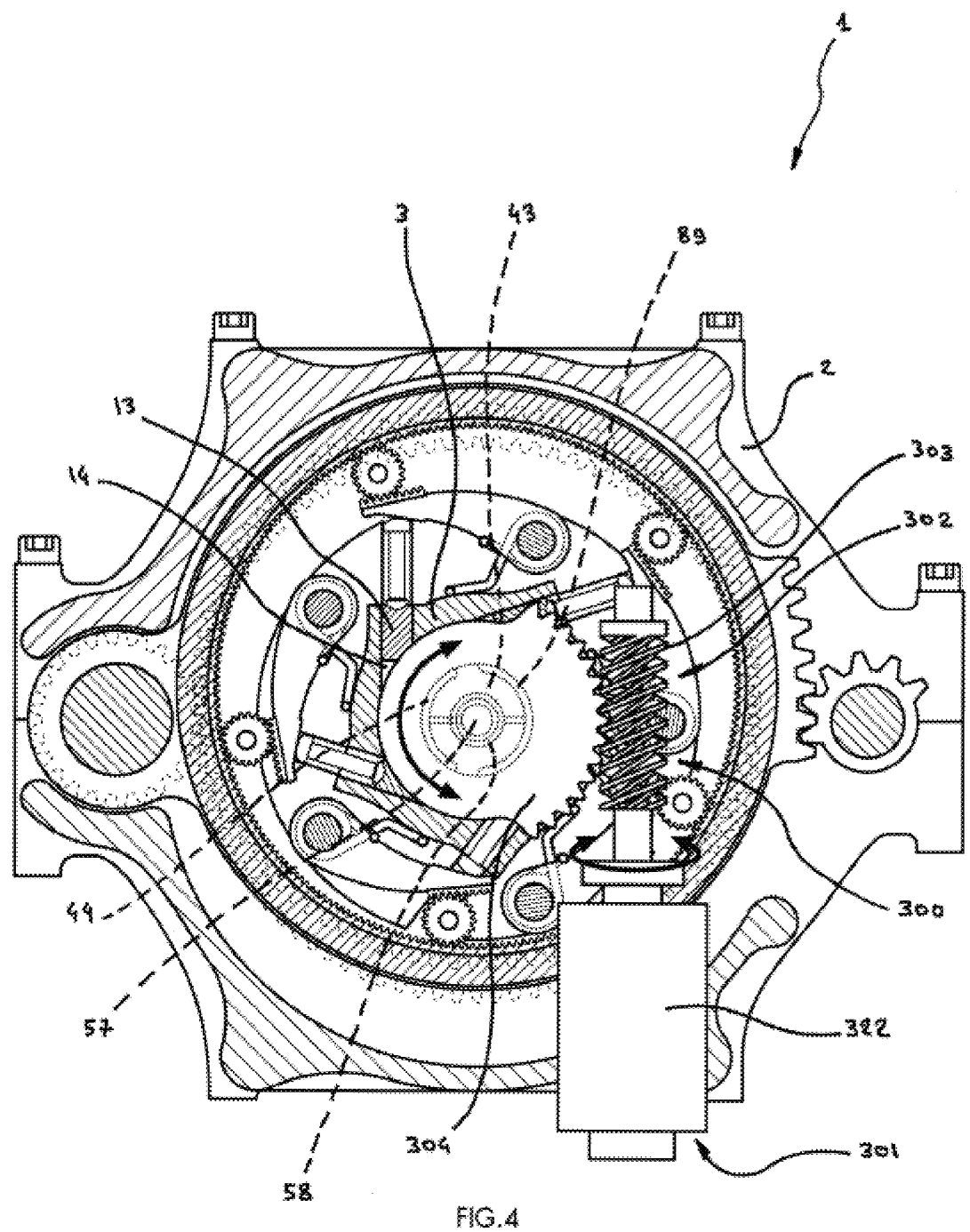
FIG. 4 shows a schematic view of the distributor phase shifter for a hydraulic pump motor according to the invention equipping the hydraulic pump motor shown in schematic section, which phase shifter is constituted in particular by an electrical motor which can entrain in rotation an endless worm cooperating with a worm crown wheel integral with the input-output distributor.

The variant of the embodiment of the distributor phase shifter for a hydraulic pump motor 300 according to the invention such as is shown in FIG. 4 provides that the phase shift acting element 301 can be an electrical motor 322 that can entrain an endless screw 303 in rotation whereas the means for entrainment in rotation 302 is constituted by a worm crown wheel 304 integral with the input-output distributor 43 and on which the endless worm 303 meshes in such a manner as to entrain this crown 304 in rotation which latter entrains for its part the input-output distributor 43 in rotation over a determined angular range.

Figure 6:
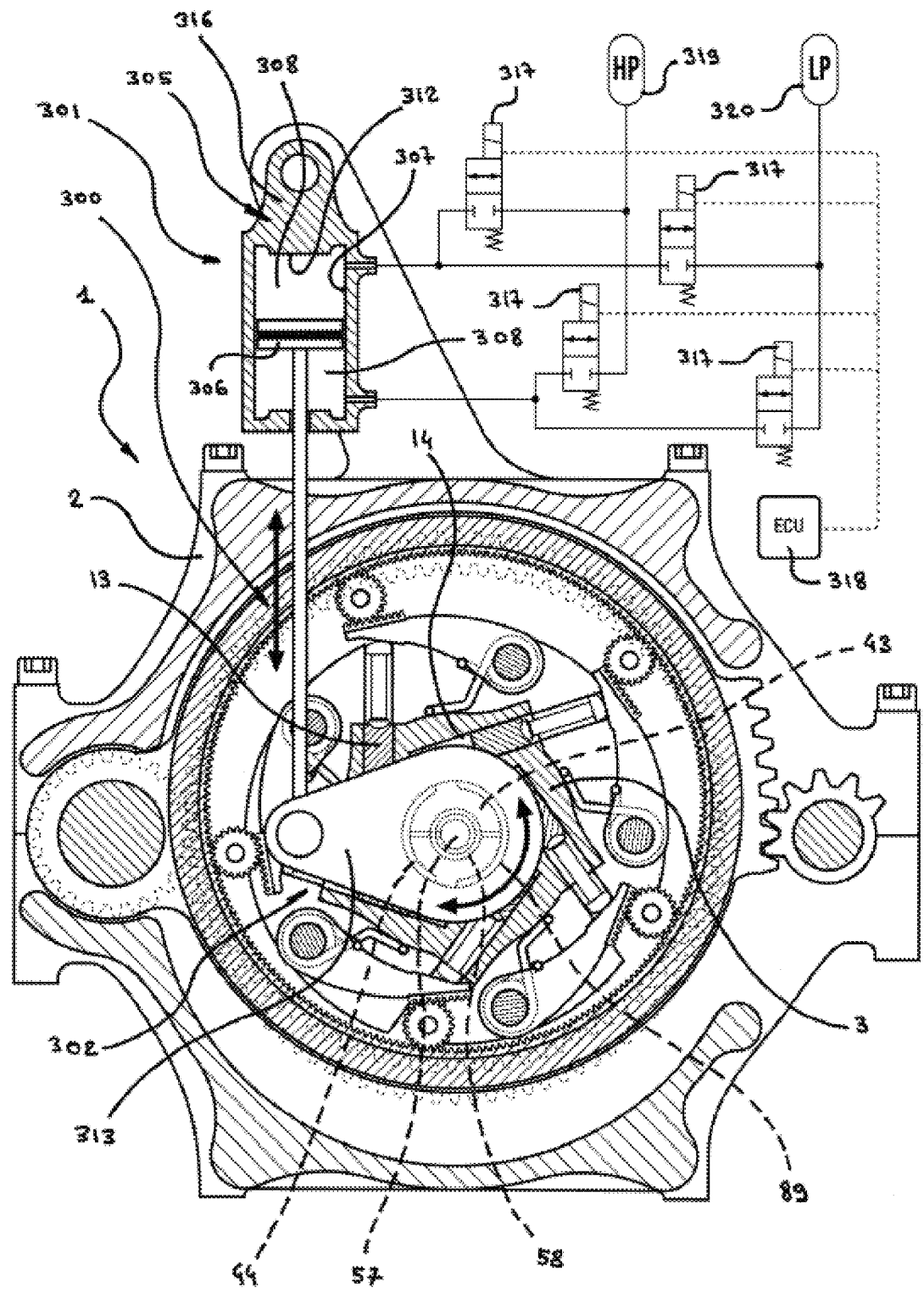
FIG. 6 shows a schematic section of the distributor phase shifter for a hydraulic pump motor according to the invention equipping the hydraulic pump motor, which phase shifter comprises a phase shifter acting element constituted by a hydraulic jack driven in a double-acting manner whose jack chambers can be put in relation with either a source of hydraulic high pressure or with a source of hydraulic low-pressure by phase shift electrical valves.

Note in the FIGS. 2, 3 and 6 that the means for entrainment in rotation 302 can comprise a phase shift lever 313 integral with the input-output distributor 43, which lever 313 is connected to the phase shift acting element 301 directly or by the intermediation of a phase shift rocker bar 314 as shown in FIG. 3.

Note that if the phase shift lever 313 is directly connected to the phase shift acting element 301, the latter is preferably articulated to the housing of pump motor 2, whereas if this lever 313 is connected to the phase shift acting element 301 by the intermediation of a phase shift rocker bar 314, this acting element 301 is preferably mounted fixed on this housing 2 and integral with the latter.

Figure 5:
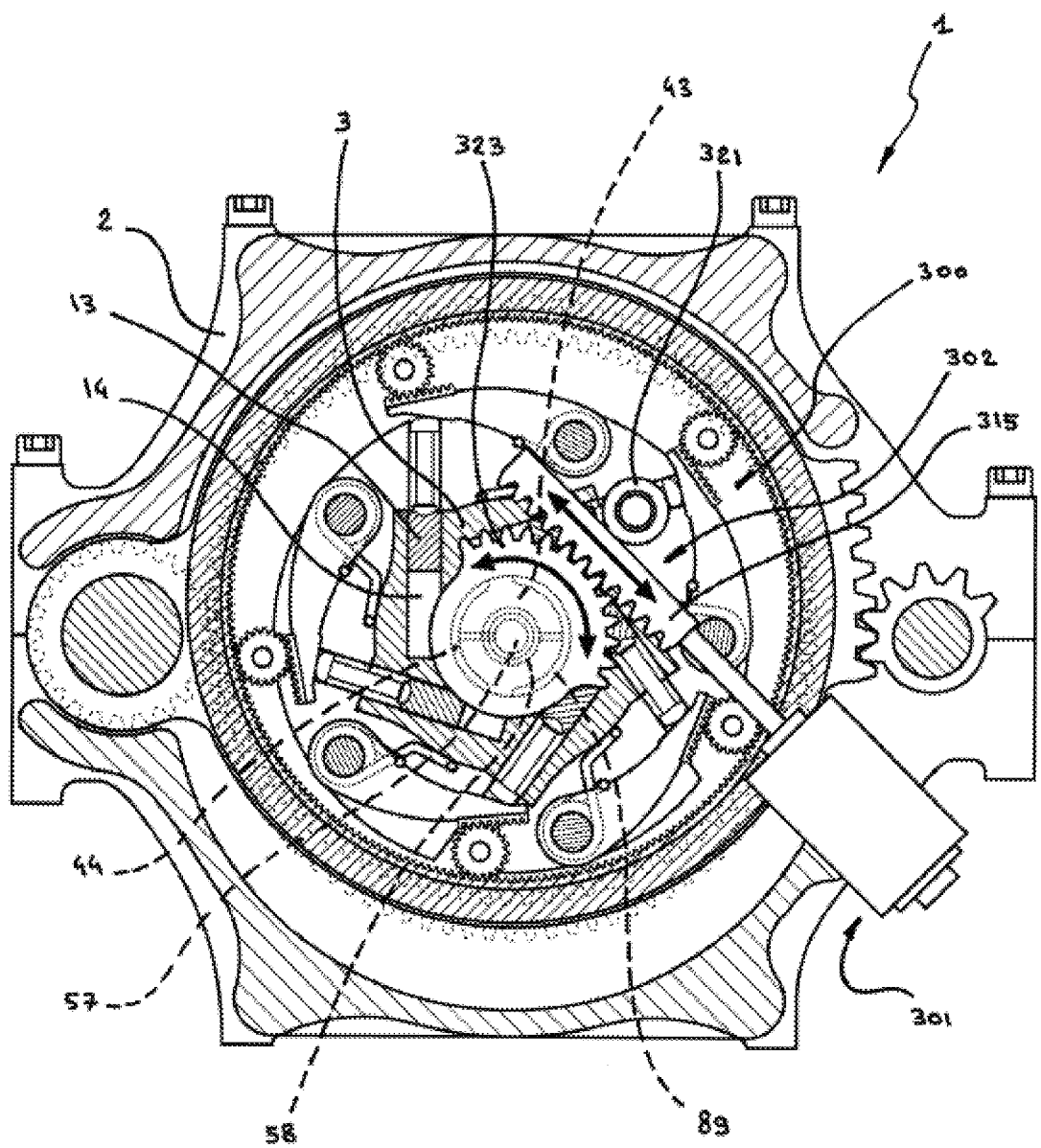
FIG. 5 shows a schematic view of the distributor phase shifter for a hydraulic pump motor according to the invention equipping the hydraulic pump motor shown in schematic section, which means for entrainment in rotation of this phase shifter is constituted by a phase shift rack which cooperates with a toothed phase shift wheel integral with the input-output distributor.

FIG. 5 shows that as a variant of the distributor phase shifter for a hydraulic pump motor 300 according to the invention the means for entrainment in rotation 302 can be constituted by a phase shift rack 315 which can be put in translation by phase shift acting element 301, which rack 315 cooperates with a phase shift toothed wheel 323 integral with the input-output distributor 43.

Note that the phase shift rack 315 can be guided in the housing of pump motor 2 by a slide, a roller 321 or by any other guide means known to a person skilled in the art.

As for FIG. 6, it shows that the phase shift acting element 301 can be a hydraulic jack 316 driven in a single-acting manner whose at least one jack chamber 308 can be related either to a high-pressure hydraulic source 319 or to a low-pressure hydraulic source 320 by at least one phase shift electrical valve 317, which latter is driven itself by a computer for managing the phase shift 318.

In this case the input-output distributor 43 and/or the phase shift acting element 301 and/or the means for entrainment in rotation 302 can be provided with a position sensor which directly or indirectly returns to the computer for managing the phase shift 318 the angular position of the input-output distributor 43 relative to the housing of pump motor 2.

Functioning of the Invention

The functioning of the distributor phase shifter for a hydraulic pump motor 300 according to the invention will be readily understood from the FIGS. 1 to 6.

FIG. 1 shows the input-output distributor 43 of the hydraulic pump motor 1 to which the distributor phase shifter for a hydraulic pump motor according to the invention applies in such a manner that its input-output angular collector of internal conduit 44 is connected to the input-output internal conduit 57, and its input-output angular collector of external conduit 89 is connected to the input-output external conduit 58.

It can be readily deduced from FIG. 1 that when the central rotor of pump motor 3 rotates clockwise, it entrains with itself the hydraulic cylinders 14 which it houses. While doing this, the hydraulic pistons 13 each move in translation in the hydraulic cylinder 14 with which it cooperates.

According to FIG. 1, if the hydraulic pump motor 1 is operating in the "pump" mode, that is, it is using up work supplied by an outer motive source in order to generate an output of oil under pressure, its hydraulic pistons 13 situated at the left of the axis of the central rotor of pump motor 3 draw in oil into the input-output angular collector of internal conduit 44. Once drawn in, this oil successively joins the hydraulic cylinders 14 corresponding to these pistons 13 via the input-output orifice of central rotor 16, then the input-output internal canal of central rotor 15, which orifice 16 and which canal 15 connect at this moment these cylinders 14 to the input-output angular collector of internal conduit 44.

The central rotor of pump motor 3 continues to rotate and these pistons 13 pass to the right of the axis of the central rotor of pump motor 3. Starting from this moment, these pistons 13 push back the oil which they previously drew in into the input-output angular collector of internal conduit 44 out of hydraulic cylinder 14 with which they cooperate. Pushed back in this manner, this oil successively passes into the input-output internal canal of central rotor 15, then through the input-output orifice of central rotor 16 before rejoining the input-output angular collector of external conduit 89.

An output of oil is established in this manner between the input-output internal conduit 57 and the input-output external conduit 58 and then from this internal conduit 57 to this external conduit 58.

According to the piston swept volume and the pressure under which the hydraulic pump motor 1 operates and according to whether the latter is operating in the "pump" mode or in the "motor" mode, the most advantageous phasing for the energetic yield of this pump motor 1 of the input-output distributor 43 relative to the housing of the pump motor 2 is moved by several degrees.

In order to give the hydraulic pump motor 1 the best possible yield in all circumstances it is therefore advantageous to control the phasing of the input-output distributor 43 relative to the housing of pump motor 2.

This is why the phase shifter of the distributor for hydraulic pump motor 300 according to the invention can make an input-output distributor 43 rotate about its longitudinal axis and over a determined angular range relative to the housing of pump motor 2 by means of the phase shift acting element 301.

To this end the phase shift acting element 301 is provided for acting directly or indirectly on the means for entrainment in rotation 302 integral with the input-output distributor 43.

It is understood according to the embodiment of the distributor phase shifter for hydraulic pump motor 300 according to the invention shown in FIG. 2 that the phasing of the input-output distributor 43 relative to the housing of the pump motor 2 changes automatically according to whether the hydraulic pump motor 1 is operating in the "pump" mode or in the "motor" mode. In fact, the "pump" mode or "motor" mode is characterized by a positive or negative pressure difference between this pressure prevailing in the input-output internal conduit 57 and the one prevailing in the input-output external conduit 58.

FIG. 2 shows that if the pressure prevailing in the input-output internal conduit 57 is greater than the one prevailing in the input-output external conduit 58, the pressure in the lower jack chamber 308 of the double-acting hydraulic jack 305 will be greater than the one prevailing in the upper jack chamber 308 of this jack 305. The result is that the double-acting piston 306 will pull on the phase shift lever 313 and that the input-output distributor 43 will rotate in the clockwise direction.

If the situation is inverted—which is characteristic of a change of mode from "pump to "motor" mode of the hydraulic pump motor 1 or inversely—and the pressure in the lower jack chamber in the lower jack chamber 308 of the double-acting hydraulic jack 305 becomes lower than the one prevailing in the upper jack chamber 308 of this jack 305, the input-output distributor 43 will rotate in the counter-clockwise direction.

FIG. 3 illustrates the same principle, implemented not with a double-acting hydraulic jack 305 but with two single-acting hydraulic jacks 309. The effect produced by this configuration is similar to that produced by the one shown in FIG. 2.

FIGS. 4, 5 and 6 yield the same result of the rotation of the input-output distributor 43 but the direction and the amplitude of this rotation can be determined in a more analytic manner or from mapping data by a computer for managing the phase shift 318 which can precisely regulate the angular position of this distributor 43 as a function of as many parameters as are necessary for giving the hydraulic pump motor 1 the best possible yield and the best possible efficiency.

The possibilities of the distributor phase shifter for a hydraulic pump motor 300 in accordance with the invention are not limited to the applications that were described and it should be furthermore understood that the preceding specification was given only by way of example and that it does not limit in any way the scope of this invention, which will not be departed from by replacing the described details of execution by any other equivalent.

The invention claimed is:

1. A system comprising:
a hydraulic pump motor including
a pump motor housing, and
a pump motor central rotor that houses at least one hydraulic cylinder in which a hydraulic piston is configured to move in translation, the central rotor cooperating with an input-output distributor which presents the central rotor with an input-output angular collector of a first conduit and an input-output angular collector of a second conduit such that when the central rotor rotates relative to the pump motor housing, the hydraulic cylinder is alternately placed in relation, via an input-output internal canal of the central rotor and an input-output orifice of the central rotor, with an input-output first conduit by the input-output angular collector of the first conduit and with an input-output second conduit by the input-output angular collector of the second conduit; and
a distributor phase shifter including
at least one phase shift acting element which is configured to be directly or indirectly supported on the pump motor housing to rotate the input-output distributor around its longitudinal axis and over a determined angular range while acting directly or indirectly on an entrainment in rotation system having at least one part integral with the input-output distributor.

2. The system according to claim 1, wherein the phase shift acting element is a double-acting hydraulic jack having a double-acting piston that defines, with a jack cylinder and two jack ends, two jack chambers, a first chamber of the jack chambers being configured to communicate with the input-output first conduit, a second jack chamber of the jack chambers being configured to communicate with the input-output second conduit.

3. The system according to claim 1, wherein the phase shift acting element is constituted by two single-acting hydraulic jacks each having a single-acting piston that defines, with a jack cylinder and a jack end, a jack chamber, a first jack chamber of a first hydraulic jack of the two hydraulic jacks being configured to communicate with the input-output first conduit, a second jack chamber of a second hydraulic jack of the hydraulic jacks being configured to communicate with the input-output second conduit,
the single-acting piston of the first hydraulic jack being configured to, via the entrainment in rotation system, entrain the input-output distributer in a first direction,
the single-acting piston of the second hydraulic jack being configured to, via the entrainment in rotation system, entrain the input-output distributor in a second direction.

4. The system according to claim 1, wherein one or more of the phase shift acting element and the entrainment in rotation system cooperate with at least one return spring of the acting element.

5. The system according to claim 2, wherein the jack chambers each house at least one return spring of the acting element which is configured to be directly or indirectly supported on the jack end and on the double-acting piston or on a single-acting piston.

6. The system according to claim 1, wherein the phase shift acting element is an electrical motor configured to entrain in rotation an endless screw, and
the entrainment in rotation system is constituted by a worm crown wheel integral with the input-output distributor and on which the endless worm meshes.

7. The system according to claim 1, wherein the entrainment in rotation system comprises a phase shift lever integral with the input-output distributor, the lever being configured to be linked to the phase shift acting element directly or by the intermediation of a phase shift rocker bar.

8. The system according to claim 1, wherein the entrainment in rotation system is constituted by a phase shift rack configured to be moved in translation by the phase shift acting element, the rack being configured to cooperate with a toothed phase shift wheel integral with the input-output distributor.

9. The system according to claim 1, wherein the phase shift acting element is a hydraulic jack driven with single action or double action and having at least one jack chamber configured to be put in relation either with a high-pressure hydraulic source or with a low-pressure hydraulic source by at least one phase shift electrical valve.

10. The system according to claim 3, wherein the jack chambers each house at least one return spring of the acting element which is configured to be directly or indirectly supported on the jack end and on a double-acting piston or on one of the single-acting pistons.

* * * * *